United States Patent
Chen et al.

(10) Patent No.: US 6,555,168 B2
(45) Date of Patent: Apr. 29, 2003

(54) INK JET PRINTING METHOD

(75) Inventors: Huijuan Chen, Webster, NY (US); Steven Evans, Rochester, NY (US); James Reczek, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/046,888

(22) Filed: Jan. 15, 2002

(65) Prior Publication Data

US 2002/0086112 A1 Jul. 4, 2002

Related U.S. Application Data

(63) Continuation-in-part of application No. 09/510,879, filed on Feb. 23, 2000.

(51) Int. Cl.⁷ .............................. B05D 1/26; B05D 7/00
(52) U.S. Cl. ...................... 427/261; 427/288; 427/411; 427/412.1
(58) Field of Search .................... 427/261, 288, 427/411, 412.1

(56) References Cited

U.S. PATENT DOCUMENTS

| | | | | | |
|---|---|---|---|---|---|
| 4,246,154 A | * | 1/1981 | Yao | ............................. | 524/88 |
| 4,460,637 A | * | 7/1984 | Miyamoto et al. | ........... | 428/212 |
| 4,503,118 A | * | 3/1985 | Murakami et al. | ........... | 428/323 |
| 4,954,395 A | * | 9/1990 | Hasegawa et al. | ........ | 428/318.4 |
| 5,165,973 A | * | 11/1992 | Kojima et al. | ............... | 428/331 |
| 5,725,961 A | * | 3/1998 | Ozawa et al. | ................ | 428/500 |
| 5,852,074 A | * | 12/1998 | Tsutsumi et al. | ............ | 523/161 |
| 5,985,988 A | * | 11/1999 | Hodge | ........................ | 524/604 |
| 5,997,622 A | * | 12/1999 | Weber et al. | ............. | 106/31.48 |
| 6,020,400 A | * | 2/2000 | Anton et al. | ................. | 523/161 |

* cited by examiner

Primary Examiner—Shrive P. Beck
Assistant Examiner—Kirsten Crockford Jolley
(74) Attorney, Agent, or Firm—Harold E. Cole

(57) ABSTRACT

An ink jet printing method, having the steps of: A) providing an ink jet printer that is responsive to digital data signals, B) loading the printer with ink-receptive elements having a support having thereon a continuous, coextensive porous ink-receptive layer, C) loading the printer with an ink jet ink composition comprising an aqueous-dispersible polyester having contained therein a water-insoluble dye, and D) printing on the ink-receptive element using the ink jet ink in response to the digital data signals.

7 Claims, No Drawings

INK JET PRINTING METHOD

CROSS REFERENCE TO RELATED APPLICATION

This application is a continuation-in-part of U.S. patent application Ser. No. 09/510,879 filed Feb. 23, 2000 of Chen et al.

FIELD OF THE INVENTION

This invention relates to an ink jet printing method which employs a porous receiver and an ink jet composition which provides improved light and dark stability.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

U.S. Pat. Nos. 4,246,154 and 5,852,074 relate to an ink jet ink composition comprising a water-insoluble dye dispersed in a water-dispersible polymer. However, there is a problem with this ink in that when it is printed onto a conventional receiver, the dry time is slow.

U.S. Pat. No. 4,460,637 relates to a porous ink jet receiver element. However, there is a problem with this element in that when it is printed with a conventional aqueous dye-based ink, the printed image has poor light and dark stability.

It is an object of this invention to provide an ink jet printing method which provides an image which has a fast dry time. It is another object of this invention to provide an ink jet printing method which provides an image which has improved light and dark stability.

SUMMARY OF THE INVENTION

These and other objects are achieved in accordance with this invention which relates to an ink jet printing method, comprising the steps of:

A) providing an ink jet printer that is responsive to digital data signals,

B) loading the printer with ink-receptive elements comprising a support having thereon a continuous, coextensive porous ink-receptive layer, C) loading the printer with an ink jet ink composition comprising an aqueous-dispersible polyester having contained therein a water-insoluble dye, and D) printing on the ink-receptive element using the ink jet ink in response to the digital data signals.

DETAILED DESCRIPTION OF THE INVENTION

The support for the ink-receptive element can be paper or resin-coated paper, or plastics such as a polyester-type resin such as poly(ethylene. terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. The thickness of the support employed in the invention can be, for example, from about 12 to about 500 $\mu$m, preferably from about 75 to about 300 $\mu$m.

In a preferred embodiment of the invention the continuous, coextensive porous ink-receptive layer contains inorganic particles such as silica, alumina, titanium dioxide, clay, calcium carbonate, barium sulfate, or zinc oxide. In another preferred embodiment, the porous ink-receptive layer comprises from about 20% to about 90% inorganic particles and from about 10% to about 80% polymeric binder, such as gelatin, poly(vinyl alcohol), poly(vinyl pyrrolidinone) or poly(vinyl acetate). The porous ink-receptive layer can also contain polymer micro-porous structures without inorganic filler particles as shown in U.S. Pat. Nos. 5,374,475 and 4,954,395.

A broad range of water-insoluble dyes may be used in the invention such as an oil dye, a disperse dye, a solvent dye, as disclosed in U.S. Pat. Nos. 4,246,154 and 5,852,074, or a metal-complex dye, such as the water-insoluble analogues of those described in U.S. Pat. Nos. 5,997,622 and 6,001,161, i.e., a transition metal complex of an 8-heterocyclylazo-5-hydroxyquinoline.

The dye-containing aqueous-dispersible polyester used in the invention can be prepared by dissolving the dye in a water-miscible organic solvent, mixing the solution with the aqueous-dispersible polyester and then removing the solvent. Useful water-miscible organic solvents are water-miscible alcohols, ketones and amides, tetrahydrofuran, N-methyl-2-pyrrolidone, dimethylsulfoxide and mixtures thereof, such as acetone, ethyl alcohol, methyl alcohol, isopropyl alcohol, dimethylformamide, methyl-ethyl ketone etc.

The ink jet ink containing the water-dispersible polyester employed in the invention consists of water as a continuous phase and dye-containing polyester as a dispersed phase. In a preferred embodiment of the invention, the aqueous-dispersible polyester meets the following test: At 25° C., the aqueous-dispersible polyester must: (a) be capable of forming a stable dispersion with water at a concentration of from 0.2 to 50 percent by weight, preferably 1 to 20 percent by weight, and (b) when 100 ml of the aqueous-dispersible polyester is then mixed in an equal volume of the water-miscible organic solvent described above, stirred and allowed to stand for 10 minutes exhibit no observable coagulation of the aqueous-dispersible polyester. In order to be useful in the ink, the aqueous-dispersible polyester should have an average particle size of <1 $\mu$m, preferably <0.2 $\mu$m.

In a preferred embodiment of the invention, the water-dispersible polyester contains dicarboxylic acid recurring units and diol recurring units consistent with the following general formula:

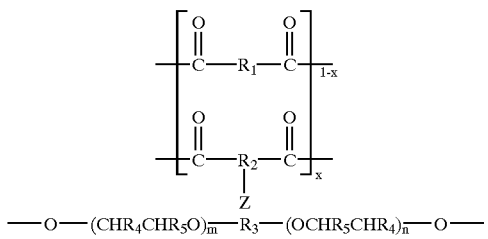

wherein:

$R_1$ and $R_2$ each independently represents a saturated or unsaturated divalent hydrocarbon, or aromatic or aliphatic group or contains both aromatic and aliphatic groups, such as 1,2-phenylene, 1,3-phenylene, 1,4-phenylene, 1,4-naphthylene, 2,6-naphthylene, 4,4'-oxydiphenylene, 1,4-cyclohexylene, 1,2-ethylene, 1,4-butylene, and the like;

Z represents an ionic moiety derived from a sulfonic acid.

x represents a mole fraction from about 0.05 to about 0.8;

$R_3$ represents S; an alkylene group of 1 to about 16 carbon atoms, a cycloalkylene group of 5 to about 20 carbon atoms; a cyclobisalkylene group of about 8 to about 20 carbon atoms; a bi- or tri-cycloalkylene group of about 7 to about 16 carbon atoms; a bi- or tri-cyclobisalkylene group of about 9 to about 18 carbon atoms; an arylenebisalkylene group of from 8 to about 20 carbon atoms or an arylene group of 6 to about 12 carbon atoms; or a carbinol-teiminated polydimethylsiloxane segment, $R_4$ and $R_5$ each independently represents H, a substituted or unsubstituted alkyl group of 1 to about 6 carbon atoms or a substituted or unsubstituted aryl group of about 6 to about 12 carbon atoms; and m and n each independently represents an integer from 0–4.

In a preferred embodiment of the invention, the dicarboxylic acid recurring units contain an ionic moiety derived from a sulfonic acid and includes the following:

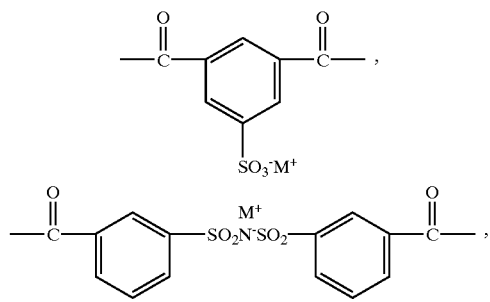

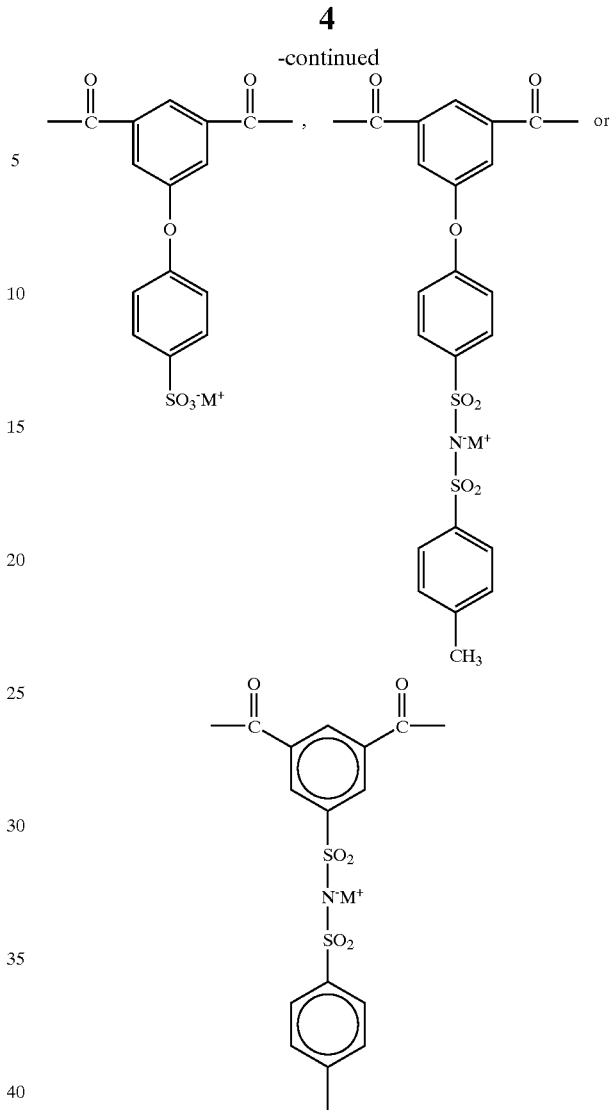

wherein:

$M^+$ represents alkali metals, such as Li, Na and K; ammonium groups such as ammonium, trimethylammonium, triethylammonium, tetraalkylammonium, aryltrialkylammonium, hydroxyalkylammonium, etc., phosphonium groups such as triphenylphosphonium or tetrabutylphosphonium; heteroaromatic ammonium groups such as pyridinium, imidazolium or N-methylammonium; sulfonium groups; guanidinium groups; amidinium groups, etc. Preferably, $M^+$ is an alkali metal, for example $Na^+$.

In a preferred embodiment of the invention, the nonionic dicarboxylic acid recurring unit is isophthalic acid, and is present in a mole fraction from approximately 0.2 to approximately 0.95, more preferably from approximately 0.6 to approximately 0.90.

In another preferred embodiment of the invention, the ionic dicarboxylic acid recurring unit is 5-sulfoisophthalic acid, and is present in a mole fraction from approximately 0.05 to 0.8, more preferably from approximately 0.01 to 0.4.

Preferred diol recurring units useful in the invention include one or more selected from ethylene glycol, diethylene glycol, triethylene glycol, thiodiethanol, 1,4-cyclohexanedimethanol, bisphenol A, trans- 1,4-cyclohexanediol, dodecanediol, cis-exo-2,3-norbornanediol, 5-norbornene-2,2-dimethanol, hydroquinone bis(2-hydroxyethylether), carbinol terminated polydimethylsiloxane, MW=1000 (DMS-C15), (Gelest Inc.), etc. More preferred are diethylene glycol and 1,4-cyclohexanedimethanol.

In addition to the dicarboxylic acid recurring units mentioned above, other carboxylic acids or their functional equivalents can be incorporated in the polyester useful for the invention. These include monocarboxylic acids such as, for example, benzoic acid, substituted benzoic acids, naphthoic acid, substituted naphthoic acids, cyclohexanecarboxylic acid, hexanoic acid, lauric acid, sulfobenzoic acid salts, etc. Other carboxylic acids or their functional equivalents include maleic acid, fumaric acid, citraconic acid, itaconic acid, mesaconic acid, and other carboxylic acids containing ethylenic unsaturation.

Still other carboxylic acids or their functional equivalents are pyromellitic acid, trimellitic acid, trimesic acid, and other polycarboxylic acids.

In addition to the diol recurring units mentioned above, other hydroxy-containing compounds or their functional equivalents can be incorporated in the polyester useful for the invention. These include phenols, hydroxybenzoic acid, cyclohexanol, lauryl alcohol, alcohols or diols containing ethylenic unsaturation, and polyols such as glycerol, trimethylol propane, and pentaerythritol.

The aqueous dispersible polyester employed in the invention may be, for example, Eastman AQ® polyesters produced by the Eastman Chemical Company. The three polyesters, Eastman AQ 29, AQ 38, and AQ 55 are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 20 to 100 nm.

A humectant is added to the composition employed in the process of the invention to help prevent the ink from drying out or crusting in the orifices of the ink jet printhead. Polyhydric alcohols useful in the composition of the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. As noted above, the humectant is employed in a concentration of from about 10 to about 50% by weight. In a preferred embodiment, diethylene glycol or a mixture of glycerol and diethylene glycol is employed a concentration of between 10 and 20 wt. %.

A co-solvent can also be employed in the composition employed in the process of the invention. The selection of a co-solvent depends on the requirements of the specific application, such as desired surface tension and viscosity, the selected colorant, drying time of the ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofufuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10 wt. %) may also be added to the ink composition employed in the process of the invention to help the ink penetrate the receiving substrate, especially when the substrate is a highly sized paper. A preferred penetrant for the inks of the present invention is n-propanol at a final concentration of 1–6 wt. %.

A biocide (0.01–1.0 wt. %) may also be added to prevent unwanted microbial growth which may occur in the ink over time. A preferred biocide for the inks of the present invention is Proxel® GXL (Zeneca Colours Co.) at a concentration of 0.05–0.5 wt. %. Additional additives which may optionally be present in ink jet inks include thickeners, conductivity enhancing agents, anti-kogation agents, drying agents, and defoamers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following examples illustrate the utility of the present invention.

EXAMPLES

The following dyes were used in Example 1:

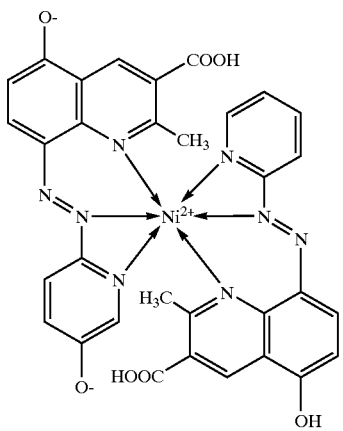

Water-soluble dye, Control Dye-1

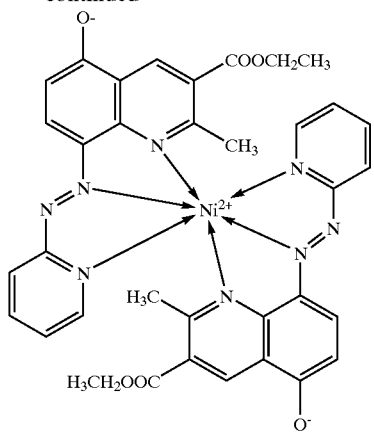

Water-insoluble Dye 1
(Analogue of Control Dye-1)

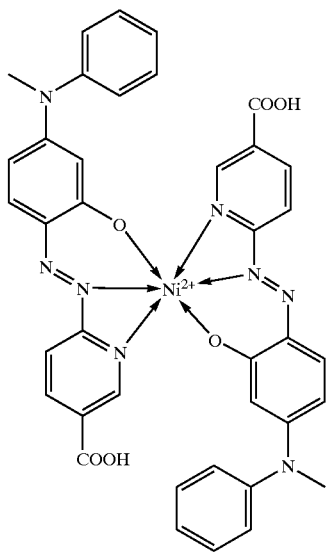

Water-soluble dye, Control Dye-2

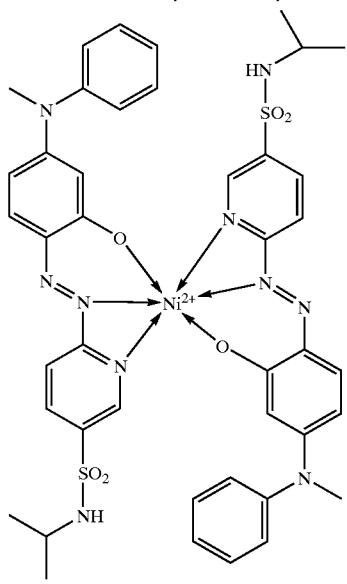

Water-insoluble Dye 2
(Analogue of Control Dye-2)

The characterizations of polymeric materials in the following examples were obtained by the following tests or analytical techniques:

Glass Transition Temperature and Melting Temperature

Both glass transition temperature (Tg) and melting temperature (Tm) of the dry polymer material were determined by differential scanning calorimetry (DSC), using a ramping rate of 20° C./minute. Tg is defined herein as the inflection point of the glass transition and Tm is defined herein as the peak of the melting transition.

Particle Size Measurement

All particles were characterized by MICROTRAC II Ultrafine particle analyzer (UPA) manufactured by Leeds & Northrup. The data reported are the size that 50% of the volume in the sample that is smaller than the indicated size, which is also known as the median diameter.

Average Molecular Weight

The samples were analyzed by size-exclusion chromatography in tetrahydrofuran using three Polymer Laboratories Plgel® mixed-C columns. The column set was calibrated with narrow-molecular-weight distribution polystyrene standards between 595 (log M=2.76) and 2170000 (log M=6.34) Dalton. Number average molecular weight and polydispersity (defined as the ratio of weight average molecular weight and number average molecular weight) were reported.

Aqueous Dispersible Polyester

An AQ55® dispersion was commercially available from Eastman Chemical Co., and was used as received at 31.5% solids by weight. The Tg was 55 ° C. as measured by DSC and particle size was 20 nm as measured by UPA.

Example 1

Comparative Element 1 (C-1) (Water Soluble Dye/Porous Receiver)

To prepare a comparative ink jet ink, 87 mg of Control Dye 1, 0.15g Surfynol® 465 (from Air Products), 0.75 g glycerol, 0.6 g diethylene glycol, 0.75 g propanol were added to 13.5 g distilled water. The ink pH was adjusted to approximately 8 by addition of triethanolamine or dilute sodium hydroxide. The final ink contained 0.58% dye, and 1% Surfynol® 465, 5% glycerol, 4% diethylene glycol and 5% propanol. The solution was filtered through a 0.45 $\mu$m polytetrafluoroethylene filter and filled into a refillable inkjet cartridge.

A test image consisting of a series of 21 variable density patches, approximately 15 by 13 mm in size, ranging from 5% dot coverage to 100% dot coverage was printed onto commercially available Epson photo paper (Catalog NO. S041141), a porous receiver, with an Epson 200 inkjet printer. The sample was allowed to dry for 24 hours at ambient temperature and humidity.

Comparative Element 2 (C-2) (Water Soluble Dye/Porous Receiver)

This element was prepared similar to Comparative Element 1 except that commercially available Konica QP Photo IJ Paper (Catalog No. KJP-LT-GH-15-QP PI), a porous receiver, was used instead of Epson photo paper. The results are also shown in Table 1.

Comparative Element 3 (C-3) (Water Soluble Dye/Porous Receiver)

This element was prepared similar to Comparative Element 1 except that commercially available Mitsubishi Calcomp Glossy CJ paper (Catalog No. 8021601720), a porous receiver, was used instead of Epson photo paper. The results are also shown in Table 1.

Comparative Element 4 (C-4) (Water Soluble Dye/Porous Receiver)

This element was prepared similar to Comparative Element 1 except that Control Dye 2 was used instead of Control Dye 1. The results are also shown in Table 1.

Comparative Element 5 (C-5) (Water Soluble Dye/Porous Receiver)

This element was prepared similar to Comparative Element 2 except that Control Dye 2 was used instead of Control Dye 1. The results are also shown in Table 1.

Comparative Element 6 (C-6) (Water Soluble Dye/Porous Receiver)

This element was prepared similar to Comparative Element 3 except that Control Dye 2 was used instead of Control Dye 1. The results are also shown in Table 1.

Element 1 of the Invention (Water Insoluble Dye/Porous Receiver)

An element similar to Comparative Element 1 was prepared except that AQ55 containing dye 1 was used instead of Control Dye 1. The AQ55 dispersion was prepared as follows: to 4.76 g of 31.5% commercially available dispersion AQ55 (from Eastman Chemical Co.) was added 10.2 g of water and 15.0 g of methanol. The resulting composition was stirred vigorously at room temperature to form the latex solution.

To prepare a dye solution, 150 mg of Dye 1 was dissolved in a mixture of 6.0 ml of methanol and 6.0 ml of methylene chloride. The dye solution was then added dropwise to the above AQ55 dispersion with continuous stirring. After 1 hour, the organic solvent was removed under reduced pressure. The resulting stock solution was filtered through a 0.45 μm filter. The concentration of Dye 1 in the latex stock solution was estimated to be 1%, and polymer concentration was ~10% by weight. To prepare the ink solution for the Element 1 of the Invention (Ink A), 7.5 g of the above latex solution, 0.15 g Surfynol® 465 (from Air Products), 0.75 g glycerol, 0.6 g diethylene glycol and 0.75 g propanol were added to 5.25 g distilled water. No pH adjustment was necessary. The final Ink (Ink A) contained about 0.5% of water insoluble dye 1 and about 5% of AQ55.

Element 2 of the Invention (Water Insoluble Dye/Porous Receiver)

An element similar to Element 1 was prepared except that commercially available Konica QP Photo IJ Paper (Catalog No. KJP-LT-GH-15-QP PI), porous receiver, was used instead of Epson photo paper. The dark and light fade results from the test images are shown in Table 1.

Element 3 of the Invention (Water Insoluble Dye/Porous Receiver)

An element similar to Element 1 was prepared except that commercially available Mitsubishi Calcomp Glossy CJ paper (Catalog No. 8021601720), porous receiver, was used instead Epson photo paper. The dark and light fade results from the test images are shown in Table 1.

Element 4 of the Invention (Water Insoluble Dye/Porous Receiver)

An element similar to Element 1 was prepared except that Dye 2 was used instead of Dye 1. The Ink prepared was as designated to be Ink B. The dark and light fade results from the test images are shown in Table 1.

Element 5 of the Invention (Water Insoluble Dye/Porous Receiver)

An element similar to Element 4 was prepared except that commercially available Konica QP Photo IJ Paper (Catalog No. KJP-LT-GH-15-QP PI), a porous receiver, was used instead of Epson photo paper. The dark and light fade results from the test images are shown in Table 1.

Element 6 of the Invention (Water Insoluble Dye/Porous Receiver)

An element similar to Element 4 was prepared except that commercially available Mitsubishi Calcomp Glossy CJ paper (Catalog No. 8021601720), porous receiver, was used instead of Epson photo paper. The dark and light fade results from the test images are shown in Table 1.

Comparative Element 7 (C-7) (Water Soluble Dye/Non-Porous Receiver)

This element was prepared similar to Comparative Element 4 except that commercial available Kodak Photographic Quality Paper (Cat. No 8006298), a non-porous receiver, was used instead of Epson photo paper (Catalog NO. S041141). The results are also shown in Table 1.

Comparative Element 8 (C-8) (Water Insoluble Dye/Non-Porous Receiver)

This element was prepared similar to Element 4 of the Invention except that commercial available Kodak Photographic Quality Paper (Cat. No 8006298), a non-porous receiver, was used instead of Epson photo paper (Catalog NO. S041141). The results are also shown in Table 1.

Comparative Element 9 (C-9) (Water Soluble Dye-Polymer Mixture/Porous receiver)

This element was prepared similar to Comparative Element 1 (C-1) except that 2.38 g of polyester AQ55 (31.5% active) was also added to the ink in addition to the water soluble control Dye 1. The ink totaled 15.0 g which contained 5% AQ55. The test image was printed onto a porous receiver, Epson Photo Paper (Cat. No. S041141). After printing, the element is designated Comparative Element 9 (C-9). The results are also shown in Table 1.

Comparative Element 10 (C-10) (Water Soluble Dye-Polymer Mixture/Porous receiver)

This element was prepared similar to Comparative Element 9 (C-9), except that commercially available Konica QP Photo IJ Paper (Catalog No. KJP-LT-GH-15-QP PI), a porous receiver, was used instead of Epson photo paper. The results are also shown in Table 1.

Comparative Element 11 (C-11) (Water Soluble Dye-Polymer Mixture/Porous receiver)

This element was prepared similar to Comparative Element 9 (C-9), except that commercially available Mitsubishi Calcomp Glossy CJ paper (Catalog No. 8021601720), a porous receiver, was used instead of Epson photo paper. The results are also shown in Table 1.

Stability Tests

The above step images were then subjected to light fade under 50 Klux high intensity daylight irradiation for a week and dark fade at 38° C., 80% relative humidity for a week. The Status A green reflection densities of maximum density patch of the said step images were measured using an X-Rite 820® densitometer before and after the fade test for light and dark, respectively. The % Retained in Status A green density for the 100% dot coverage patches were calculated and listed in Table 1.

TABLE 1

| Elements with Water-Soluble Dyes | | | Elements with Water-Insoluble Dyes | | |
|---|---|---|---|---|---|
| % Retained at Dmax | | | % Retained at Dmax | | |
| Element | Light | Dark | Element | Light | Dark |
| C-1 | 83 | 96 | 1 | 93 | 104 |
| C-2 | 12 | 27 | 2 | 97 | 88 |
| C-3 | 80 | 68 | 3 | 97 | 99 |

TABLE 1-continued

| Elements with Water-Soluble Dyes | | | Elements with Water-Insoluble Dyes | | |
|---|---|---|---|---|---|
| | % Retained at Dmax | | | % Retained at Dmax | |
| Element | Light | Dark | Element | Light | Dark |
| C-4 | 40 | 80 | 4 | 84 | 91 |
| C-5 | 63 | 79 | 5 | 80 | 90 |
| C-6 | 69 | 81 | 6 | 86 | 88 |
| C-7 | 90 | 100 | C-8 | 91 | 100 |
| C-9 | 88 | 91 | 1 | 93 | 104 |
| C-10 | 46 | 73 | 2 | 97 | 88 |
| C-11 | 81 | 88 | 3 | 97 | 99 |

The above results show that when using a porous receiver, the elements of the invention using a water insoluble dye had improved light and dark stability as compared to the control elements using a water soluble dye. The above results also show that when using a non-porous receiver, there is no significant difference in either light or dark stability using either a water-soluble dye or a water-insoluble dye. When using an ink containing a water soluble dye along with a water dispersible polyester as a mixture in ink, the light and dark stability of the printed image on a porous receiver is worse than when using an ink containing a water insoluble dye and a water dispersible polyester.

Example 2-Comparative Example using Polyurethane and Acrylic Dispersion (U.S. Pat. No. 5,725,961) Preparation of Polymer 1 (aqueous acrylic dispersion) Methyl Acrylate/2-Acrylamido-2-methyl-1-propanesulfoni c acid, Sodium Salt (96/4)

400 g of deionized water and 0.6 g Olin 10 G® were charged to a 1-liter three-neck round-bottom flask equipped with a mechanical stirrer and nitrogen inlet. The solution was purged with nitrogen for 30 min and heated to 80° C. in a constant temperature bath. 172.8 g of methyl acrylate and 7.2 g of 2-acrylamido-2-methyl-1-propanesufonic acid (sodium salt) were added and stirred for three minutes. 16.4 g of 10% sodium persulfate solution and 5.5 g of 10% sodium metabisulfite solution were added to initiate the polymerization. Polymerization was continued for one hour and heated one more hour at 80° C. Temperature was reduced to 65–70° C. and 1 ml each of t-butyl hydroperoxide (10%) and sodium formaldehyde bisulfite (10%) were post-added. The latex was cooled and filtered. The glass transition temperature was 25° C., average particle size was 100 nm, and % solids was 30% by weight.

Preparation of Polymer 2 (aqueous polyurethane dispersion)

In a 1 liter resin flask equipped with thermometer, stirrer, water condenser and a vacuum outlet, 75.07 g polycarbonate polyol KM101733 (Mw=860) was melted and dewatered under vacuum at 100° C. The vacuum was released and at 40° C. was added 10.24 g of dimethylol propionic acid, 21.61 g of 1,4-butanediol, 10.0 g diethylene glycol, 75 g of tetrahydrofuran and 15 drops of dibutyltin dilaurate (catalyst) while stirring. The temperature was adjusted to 75° C. When a homogeneous solution was obtained, 111.47 g isophorone diisocyanate was slowly added, followed by 25 g tetrahydrofuran. The mixture was maintained for about 4 hours to complete the reaction.

The NCO (isocyanate determined by IR analysis) was substantially nil. A stoichiometric amount of potassium hydroxide based on dimethylol propionic acid was stirred in and maintained for 5 min. This was mixed with 1300 g of water under high shear to form a stable aqueous dispersion. Tetrahydrofuran was removed by heating under vacuum to give an aqueous dispersion at 19.5% solids by weight solids. The glass transition temperature was 54.5° C. as measured by DSC, the median particle size was 12 nm as measured by UPA, and the weight average molecular weight was 19,100.

Comparative Element 12 (Acrylic Dispersion)

Comparative element 12 was prepared similar to the Element 1 of the Invention except that Polymer 1 was used in the ink instead of the commercially available dispersion AQ55. The Polymer 1 dispersion was treated as follows: to 5.0 g of 30.0% of Polymer 1 was added 10.0 g of water and 15.0 g of methanol. The resulting composition was stirred vigorously at room temperature to form the latex solution.

The ink solution was prepared similarly as in Element 1 of the Invention. The final ink of Comparative Element 12 (Ink C) contained about 0.5% of water insoluble dye 1 and about 5% of Polymer 1.

Comparative Element 13 (Polyurethane Dispersion)

Comparative element 13 was prepared similar to the Element 1 of the Invention except that Polymer 2 was used in the ink instead of the commercially available dispersion AQ55. The Polymer 2 dispersion was treated as follows: to 7.7 g of 19.5% of Polymer 2 was added 7.3 g of water and 15.0 g of methanol. The resulting composition was stirred vigorously at room temperature to form the latex solution.

The ink solution was prepared similarly as in Element 1 of the Invention. The final ink of comparative element 13 (Ink D) contained about 0.5% of water insoluble dye 1 and about 5% of Polymer 2.

Ink Characterization:

The inks were placed in a sample bottle made of glass and allowed to stand at room temperature for up to three months. At the end of each month, the particle size was measured by UPA as described above. Any significant change in particle size and size distribution compared to that for the fresh sample was taken as an indication that the ink has poor storage stability. The firability of the ink was tested by filling the ink in an Epson 660 empty cartridge, printing a nozzle check pattern using the Epson 660 printer driver and test images consisting of a series of patches approximately 15 by 13 mm in size, ranging from 5% dot coverage to 100% dot coverage onto commercially available Epson photo paper (Catalog NO. S041141). Inks having missing nozzles and banding in the printed images after several (more than 3) cleaning cycles are considered to have poor firability. Inks without missing nozzles and banding after less than 3 cleaning cycles are considered to have good firability. The results are shown in Table 2.

TABLE 2

| Element | Ink | Polymer Type | Storage stability | Firability |
|---|---|---|---|---|
| 1 | Ink A | Polyester | Good | Good |
| 4 | Ink B | Polyester | Good | Good |
| C-12 | Ink C | Acrylic | Poor | Poor |
| C-13 | Ink D | Polyurethane | Poor | Not Printable |

The above results show that the ink employed with the elements of the invention using water dispersible polyester has good ink storage stability and firability, as compared to inks using polymer latex (acrylic and polyurethane) as described in the prior art.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive elements comprising a support having thereon a continuous, coextensive porous ink-receptive layer;
   C) loading said printer with an ink jet ink composition comprising an aqueous-dispersible polyester having contained therein a water-insoluble dye; and
   D) printing on said ink-receptive element using said ink jet ink in response to said digital data signals.

2. The method of claim 1 wherein said porous ink-receptive layer contains inorganic particles.

3. The method of claim 2 wherein said inorganic particles comprise silica, alumina, titanium dioxide, clay, calcium carbonate, barium sulfate, or zinc oxide.

4. The method of claim 1 wherein said porous ink-receptive layer comprises from about 20% to about 90% inorganic particles and from about 10% to about 80% polymeric binder.

5. The method of claim 4 wherein said polymeric binder is gelatin, poly(vinyl alcohol), poly(vinyl pyrrolidinone) or poly(vinyl acetate).

6. The method of claim 1 wherein said water-insoluble dye comprises an oil dye, a disperse dye, a solvent dye, or a metal-complex dye.

7. The method of claim 6 wherein said metal-complex dye comprises a transition metal complex of an 8-heterocyclylazo-5-hydroxyquinoline.

* * * * *